United States Patent
Kemmerling et al.

(10) Patent No.: US 9,394,855 B2
(45) Date of Patent: Jul. 19, 2016

(54) SUPERCHARGED INTERNAL COMBUSTION ENGINE WITH EXHAUST-GAS TURBOCHARGERS ARRANGED IN SERIES AND METHOD FOR OPERATING AN INTERNAL COMBUSTION ENGINE OF SAID TYPE

(71) Applicant: Ford Global Technologies, LLC, Dearborn, MI (US)

(72) Inventors: Joerg Kemmerling, Monschau (DE); Franz Arnd Sommerhoff, Aachen (DE); Vanco Smiljanovski, Bedburg (DE); Helmut Matthias Kindl, Aachen (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 14/469,511

(22) Filed: Aug. 26, 2014

(65) Prior Publication Data
US 2015/0075159 A1    Mar. 19, 2015

(30) Foreign Application Priority Data

Sep. 19, 2013    (DE) .................. 10 2013 218 815

(51) Int. Cl.
| | |
|---|---|
| *F02D 23/00* | (2006.01) |
| *F02M 25/07* | (2006.01) |
| *F01D 17/08* | (2006.01) |
| *F01D 17/10* | (2006.01) |

(Continued)

(52) U.S. Cl.
CPC ........... *F02M 25/0711* (2013.01); *F01D 17/08* (2013.01); *F01D 17/105* (2013.01); *F02B 37/004* (2013.01); *F02B 37/013* (2013.01); *F02B 37/025* (2013.01); *F02B 37/18* (2013.01); *F02D 23/00* (2013.01); *F02B 37/002* (2013.01); *F02B 37/183* (2013.01); *Y02T 10/121* (2013.01); *Y02T 10/144* (2013.01)

(58) Field of Classification Search
CPC ..... F01D 17/08; F01D 17/105; F02B 37/002; F02B 37/004; F02B 37/013; F02B 37/025; F02B 37/18; F02B 37/183; F02D 23/00; F02M 25/0711; F02M 25/0712
See application file for complete search history.

(56) References Cited

U.S. PATENT DOCUMENTS

| | | | |
|---|---|---|---|
| 3,557,549 A | | 1/1971 | Webster |
| 4,443,153 A | * | 4/1984 | Dibelius ............... F01D 17/141 415/151 |

(Continued)

FOREIGN PATENT DOCUMENTS

| | | |
|---|---|---|
| DE | 3145835 A1 | 5/1983 |
| DE | 19514572 A1 | 10/1996 |

(Continued)

*Primary Examiner* — Jesse Bogue
(74) *Attorney, Agent, or Firm* — Julia Voutyras; Alleman Hall McCoy Russell & Tuttle LLP (57) ABSTRACT

A supercharged internal combustion engine, comprising a high-pressure turbine connected to a channel of a low-pressure turbine and a bypass line, branching from upstream the high-pressure turbine, connectable to the channels of the low-pressure turbine via a control element positioned within the bypass line, is provided. Adjusting the control element fluidly connects each of the channels of the low-pressure turbine to the bypass line responsive to the exhaust-gas flow rate to optimize the performance of the engine.

19 Claims, 5 Drawing Sheets

(51) Int. Cl.
*F02B 37/013* (2006.01)
*F02B 37/18* (2006.01)
*F02B 37/02* (2006.01)
*F02B 37/00* (2006.01)

(56) References Cited

U.S. PATENT DOCUMENTS

| | | | | |
|---|---|---|---|---|
| 4,776,168 A | * | 10/1988 | Woollenweber | F01D 17/141 60/602 |
| 6,073,447 A | * | 6/2000 | Kawakami | F01D 9/026 60/602 |
| 7,540,150 B2 | * | 6/2009 | Schmid | F02B 37/18 123/562 |
| 8,671,682 B2 | | 3/2014 | Parlow et al. | |
| 8,814,506 B2 | * | 8/2014 | Matsuo | F01D 17/143 415/145 |
| 2006/0042247 A1 | * | 3/2006 | Haugen | F01D 9/026 60/612 |
| 2007/0074513 A1 | * | 4/2007 | Lamb | F01N 13/107 60/612 |
| 2007/0079612 A1 | * | 4/2007 | Grissom | F02B 37/013 60/602 |
| 2008/0223039 A1 | * | 9/2008 | Sumser | F01D 9/026 60/612 |
| 2012/0031092 A1 | * | 2/2012 | Sumser | F01D 17/143 60/602 |
| 2013/0167527 A1 | * | 7/2013 | Cattani | F01D 9/026 60/602 |
| 2015/0034408 A1 | * | 2/2015 | Wu | F02B 37/007 180/309 |

FOREIGN PATENT DOCUMENTS

DE 10041806 A1 3/2001
EP 1710415 A1 10/2006

\* cited by examiner

SUPERCHARGED INTERNAL COMBUSTION ENGINE WITH EXHAUST-GAS TURBOCHARGERS ARRANGED IN SERIES AND METHOD FOR OPERATING AN INTERNAL COMBUSTION ENGINE OF SAID TYPE

CROSS REFERENCE TO RELATED APPLICATIONS

The present application claims priority to German Patent Application No. 102013218815.3, filed Sep. 19, 2013, the entire contents of which are hereby incorporated by reference for all purposes.

FIELD

The present disclosure relates a method and system of operating a series sequential boosting system with a high-pressure turbine and a dual scroll low pressure turbine.

BACKGROUND

Summary

Charging an internal combustion engine increases the power by supplying compressed air for the combustion process. An exhaust-gas turbocharger, in which a compressor and a turbine are arranged on the same shaft, uses the energy supplied by the exhaust-gas flow to the turbine for driving the compressor via the shaft. The turbocharger may cause undesirable torque drop due to changes in the engine speed which influence the exhaust-gas flow and therefore the turbine pressure ratio.

In one approach, to improve the torque characteristic of a charged internal combustion engine, a turbine with a small cross section in combination with an exhaust-gas blow-off is utilized. This optimizes the compressor at low engine speeds and at speeds where an exhaust-gas flow rate is above a threshold, a part of the exhaust gas is conducted via the bypass line past the turbine. In another approach, the exhaust-gas turbocharger is designed for high engine speeds with a large turbine cross section and the intake system is designed for dynamic supercharging at low engine speeds.

A potential issue noted by the inventors with the above approaches is that the torque characteristic is only improved at certain engine operating conditions. In the first approach, the use of an exhaust-gas blow-off leads to disadvantages at high engine speeds and the compressor provided may reach the thresholds of their delivery capability and thus the desired power may no longer be provided. In the second approach, disadvantages may be the high outlay in terms of construction and the inert behavior during changes in engine speed.

One potential approach to at least partially address some of the above issues includes a system and method for a supercharged internal combustion engine comprising and intake system for the supply of charge air and an exhaust-gas discharge system for the discharge of exhaust gas with at least two series-connected exhaust-gas turbochargers which each comprise a turbine, arranged in the exhaust-gas discharge system, and a compressor, arranged in the intake system, and of which a first exhaust-gas turbocharger serves as a low-pressure stage and a second exhaust-gas turbocharger serves as a high-pressure stage. The second turbine of the second exhaust-gas turbocharger is arranged upstream of the first turbine of the first exhaust-gas turbocharger, and the second compressor of the second exhaust-gas turbocharger being arranged downstream of the first compressor of the first exhaust-gas turbocharger. A first bypass line is provided which branches off from the exhaust-gas discharge system upstream of the second turbine and which issues into the exhaust-gas discharge system upstream of the first turbine. A control element is provided for metering the exhaust-gas flow rate that is conducted via the bypass line. An exhaust-gas recirculation arrangement is provided. The first turbine is a two-channel turbine which comprises at least one rotor mounted on a rotatable shaft in a turbine housing and the second turbine is connected via an exhaust line to a first channel of the two-channel turbine. The first bypass line is connectable to both channels of the two-channel turbine, the control element blocking the first bypass line when in a rest position, connecting the first bypass line to the first channel of the two-channel when in a first working position, and connecting the first bypass line to both channels of the two-channel turbine when in a second working position.

For example, at a low exhaust-gas flow rate, the exhaust-gas flow may be directed through the second exhaust-gas turbocharger and then through the first channel of the first exhaust-gas turbocharger by positioning the control element in the rest position. This position blocks the exhaust gas flow through the bypass line and sends all of the exhaust gas flow through the high-pressure turbine before flowing through the first channel of the low-pressure turbine. In another example, at a high exhaust-gas flow rate, the exhaust-gas flow may be directed through the first bypass line to both channels of the first exhaust-gas turbocharger.

In this way, a series of turbines arranged in the exhaust-gas discharge system of an internal combustion engine may provide a desired torque based on engine operating conditions by adjusting the control element positioned in the first bypass line. Thus, the second turbocharger may be optimized for low engine speed charging and the first turbocharger may be optimized for high engine speed charging and operating the control element allows for optimization of charging at engine operating conditions between the upper and lower threshold.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present application relates to a supercharged internal combustion engine comprising an intake system for the supply of charge air and an exhaust-gas discharge system for the discharge of the exhaust gas and having at least two series-connected exhaust-gas turbochargers which each comprise a turbine arranged in the exhaust-gas discharge system and a compressor arranged in the intake system and of which a first exhaust-gas turbocharger serves as a low-pressure stage and a second exhaust-gas turbocharger serves as a high-pressure stage, the second turbine of the second exhaust-gas turbocharger being arranged upstream of the first turbine of the first exhaust-gas turbocharger, and the second compressor of the second exhaust-gas turbocharger being arranged downstream of the first compressor of the first exhaust-gas turbocharger, a first bypass line being provided which branches off from the exhaust-gas discharge system upstream of the second turbine and which issues into the exhaust-gas discharge system upstream of the first turbine, a control element being provided for metering the exhaust-gas flow rate that is conducted via the bypass line, and an exhaust-gas recirculation arrangement being provided.

The present application also relates to a method for operating a supercharged internal combustion engine of the above-stated type.

An internal combustion engine of the type mentioned in the introduction is used as a motor vehicle drive unit. Within the context of the present application, the expression "internal combustion engine" encompasses Otto-cycle engines, diesel engines and also hybrid internal combustion engines, which utilize a hybrid combustion process, and hybrid drives which comprise not only the internal combustion engine but also an electric machine which may be connected in terms of drive to the internal combustion engine and which receives power from the internal combustion engine or which, as a switchable auxiliary drive, additionally outputs power.

Supercharging serves primarily to increase the power of the internal combustion engine. Here, the air for the combustion process is compressed, as a result of which a greater air mass may be supplied to each cylinder per working cycle. In this way, the fuel mass and therefore the mean pressure may be increased.

Supercharging is a suitable means for increasing the power of an internal combustion engine while maintaining an unchanged swept volume, or for reducing the swept volume while maintaining the same power. Thus, supercharging leads to an increase in volumetric power output and an improved power-to-weight ratio. For the same vehicle boundary conditions, it is thus possible to shift the load collective toward higher loads, at which the specific fuel consumption is lower. This is also referred to as downsizing.

Supercharging consequently assists in the constant efforts being made in the development of internal combustion engines to minimize fuel consumption, that is to say increase the efficiency of the internal combustion engine, owing to the limited resources of fossil fuels, for example owing to the limited availability of mineral oil as raw material for the production of fuels for the operation of internal combustion engines.

For supercharging, use is generally made of an exhaust-gas turbocharger, in which a compressor and a turbine are arranged on the same shaft. The hot exhaust-gas flow is supplied to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the cylinders is obtained. A charge-air cooling arrangement may additionally be provided, by means of which the compressed charge air is cooled before it enters the cylinders.

The advantage of the exhaust-gas turbocharger for example in relation to a mechanical charger is that no mechanical connection for transmitting power exists or is required between charger and internal combustion engine. While a mechanical charger extracts the energy required for driving it from the internal combustion engine, and thereby reduces the output power and consequently adversely affects the efficiency, the exhaust-gas turbocharger utilizes the exhaust-gas energy of the hot exhaust gases.

Potential issues may be encountered in the configuration of the exhaust-gas turbocharging, wherein it is basically sought to obtain a noticeable performance increase in all engine speed ranges. In the case of supercharged internal combustion engines with an exhaust-gas turbocharger, a torque drop is observed when a certain engine speed is undershot. Said effect is undesirable and is thus also one of the most severe disadvantages of exhaust-gas turbocharging.

Said torque drop is understandable if one takes into consideration that the charge pressure ratio is dependent on the turbine pressure ratio. For example, if the engine speed is reduced, this leads to a smaller exhaust-gas flow and therefore to a lower turbine pressure ratio. This has the result that, toward lower engine speeds, the charge pressure ratio likewise decreases, which equates to a torque drop.

In some approaches, it has been sought to improve the torque characteristic of a supercharged internal combustion engine by various measures, for example by means of a small design of the turbine cross section in combination with exhaust-gas blow-off. If the exhaust-gas flow rate exceeds a critical threshold, a part of the exhaust gas is, within the course of an exhaust-gas blow-off, conducted via a bypass line past the turbine. The exhaust-gas blow-off however leads to disadvantages at high engine speeds.

It is basically also possible to provide a small design of the turbine cross section together with a charge-air blow-off facility, wherein said variant is seldom used owing to the energy-related disadvantages of the charge-air blow-off, and the compressors provided may reach the thresholds of their delivery capability, and thus the desired power may no longer be provided.

The exhaust-gas turbocharger may however also be designed for high engine speeds or high exhaust-gas flow rates, with a large turbine cross section. Here, the intake system is then designed in such a way that dynamic supercharging takes place at low engine speeds as a result of wave phenomena. Disadvantages here may be the high outlay in terms of construction and the inert behavior during changes in engine speed.

A turbine with variable turbine geometry permits an adaptation of the turbine geometry or of the effective turbine cross section to the respective operating point of the internal combustion engine, such that regulation of the turbine geometry may be performed with regard to low and high rotational speeds or with regard to low and high exhaust-gas flow rates. The turbine geometry may however be adapted within certain thresholds, and not to any desired extent.

The torque characteristic of a supercharged internal combustion engine may furthermore be improved by means of multiple turbochargers connected in parallel or in series, if appropriate in combination with a mechanical charger.

The internal combustion engine to which the present application relates has at least two turbochargers arranged in series. By connecting two exhaust-gas turbochargers in series, of which one exhaust-gas turbocharger serves as a high-pressure stage and one exhaust-gas turbocharger serves as a low-pressure stage, the combined compressor characteristic map may advantageously be expanded, specifically both in the direction of smaller compressor flows and also in the direction of larger compressor flows.

In one example, with the exhaust-gas turbocharger which serves as a high-pressure stage, it is possible for the surge limit to be shifted in the direction of smaller compressor flows, as a result of which high charge pressure ratios may be obtained even with small compressor flows, which considerably improves the torque characteristic in the lower part-load range. This is achieved by designing the high-pressure turbine for small exhaust-gas flows and by providing a bypass line by means of which, with increasing exhaust-gas flow, an increasing amount of exhaust gas is conducted past the high-pressure turbine. For this purpose, the bypass line branches off from the exhaust-gas discharge system upstream of the high-pressure turbine and opens into the exhaust-gas discharge system again downstream of the high-pressure turbine and upstream of the low-pressure turbine, wherein a shut-off element is arranged in the bypass line in order to control the exhaust-gas flow conducted past the high-pressure turbine.

Two series-connected exhaust-gas turbochargers however also offer further advantages. The power boost through supercharging may be further increased. Furthermore, the response behavior of an internal combustion engine supercharged in this way is considerably improved—for example in the part-load range—in relation to a similar internal combustion engine with single-stage supercharging. The reason for this is that the relatively small high-pressure stage is less inert than a relatively large exhaust-gas turbocharger used for single-stage supercharging, because the rotor of an exhaust-gas turbocharger of smaller dimensions may accelerate and decelerate more quickly.

This also has advantages with regard to particle emissions. Because, during an acceleration, the required increase in the air mass supplied to the cylinders for the increased fuel flow rate takes place with a delay owing to the inertia of the rotors, it is the case with a relatively small high-pressure turbocharger that the charge air is supplied to the engine virtually without a delay, and thus operating states with increased particle emissions may be virtually eliminated.

Despite the advantageous effects described, an internal combustion engine with two turbochargers arranged in series also has further potential for improvement.

The high-pressure turbine may not be designed to be arbitrarily small, such that concepts may be required which permit an optimization of the supercharging at low and extremely low exhaust-gas flow rates.

In some approaches, the low-pressure turbine is also equipped with a blow-off line in order, at maximum exhaust-gas flow rates, to conduct exhaust gas past the low-pressure turbine. That is to say, operating points exist at which use is not made, or use may not be made, of the exhaust-gas energy or exhaust-gas enthalpy of the entire exhaust-gas flow. The background to the exhaust-gas blow-off at the low-pressure turbine is that the low-pressure turbine may not be designed for maximum exhaust-gas flow rates without accepting a decrease in supercharging behavior in the case of medium exhaust-gas flow rates, when the exhaust-gas flow rate conducted past the high-pressure turbine increases as the exhaust-gas flow increases.

In summary, it may be stated that, even in the case of internal combustion engines with two turbochargers arranged in series, further measures may be required in order to improve the supercharging behavior, such that the operating behavior of the internal combustion engine is further improved with regard to the significant variation in exhaust-gas flow rates during operation.

Against this background, it is an object of the present application to provide a supercharged internal combustion engine as per the preamble of claim 1, the supercharging behavior of which is improved, for example with regard to the significant variation in exhaust-gas flow rates during operation.

It is a further sub-object of the present application to specify a method for operating a supercharged internal combustion engine of the stated type.

The first sub-object is achieved by means of a supercharged internal combustion engine having an intake system for the supply of charge air and having an exhaust-gas discharge system for the discharge of the exhaust gas and having at least two series-connected exhaust-gas turbochargers which each comprise a turbine arranged in the exhaust-gas discharge system and a compressor arranged in the intake system and of which a first exhaust-gas turbocharger serves as a low-pressure stage and a second exhaust-gas turbocharger serves as a high-pressure stage, the second turbine of the second exhaust-gas turbocharger being arranged upstream of the first turbine of the first exhaust-gas turbocharger, and the second compressor of the second exhaust-gas turbocharger being arranged downstream of the first compressor of the first exhaust-gas turbocharger, a first bypass line being provided which branches off from the exhaust-gas discharge system upstream of the second turbine and which issues into the exhaust-gas discharge system upstream of the first turbine, a control element being provided for metering the exhaust-gas flow rate that is conducted via the bypass line, and an exhaust-gas recirculation arrangement being provided, and wherein the first turbine is a two-channel turbine which comprises at least one rotor mounted on a rotatable shaft in a turbine housing, the second turbine is connected via an exhaust line to a first channel of said two-channel turbine, and the first bypass line is connectable to both channels of the two-channel turbine, the control element blocking the first bypass line when in a rest position, connecting the first bypass line to the first channel of the two-channel turbine when in a first working position, and connecting the first bypass line to both channels of the two-channel turbine when in a second working position.

The low-pressure turbine of the internal combustion engine according to the present application is a two-channel turbine. By virtue of the fact that the exhaust-gas flow in the low-pressure stage is conducted to the at least one rotor not via a single, relatively large channel, but instead two channels may be provided, it is possible for the exhaust-gas flow to be conducted to the at least one rotor via a single, relatively small channel, or to be distributed across both channels.

According to the present application, the second turbine, that is to say the high-pressure turbine, is connected via an exhaust line to a first channel of the two-channel low-pressure turbine. The exhaust gas that is conducted through the high-pressure turbine is supplied exclusively to the first channel of the low-pressure turbine. Since said single channel has a smaller flow cross section than the channel of a single-channel low-pressure turbine, the exhaust gas that is supplied to the rotor of the low-pressure turbine exhibits greater energy. The latter fact improves the supercharging behavior at relatively low exhaust-gas flow rates, that is to say at relatively low engine speeds.

The supercharging behavior is however also considerably improved toward higher exhaust-gas flow rates, specifically likewise owing to the fact that the low-pressure turbine of the internal combustion engine according to the present application is a two-channel turbine, that is to say, has more than one channel, specifically two channels.

If the exhaust-gas flow rate exceeds a predefinable exhaust-gas flow rate, for example the maximum admissible exhaust-gas flow rate of the high-pressure turbine, a first bypass line, which bypasses the high-pressure turbine, is opened, that is to say a control element is moved from a rest position, in which said first bypass line is blocked, into a first working position. In the first working position, the bypass line is connected to the first channel of the two-channel low-pressure turbine. The exhaust gas that is conducted past the high-pressure turbine is consequently supplied exclusively to the first channel of the low-pressure turbine. Since said single channel—as already mentioned further above—has a smaller flow cross-sectional than is conventional, the exhaust gas supplied to the rotor of the low-pressure turbine exhibits greater energy, even at medium exhaust-gas flow rates.

In another embodiment, the low-pressure turbine may be equipped with a blow-off line.

The low-pressure turbine may be designed for the maximum exhaust-gas flow rate, without accepting a decrease in supercharging behavior at relatively low or medium exhaust-gas flow rates.

This is because, in addition to the exhaust gas conducted through the high-pressure turbine, the exhaust gas that is conducted past the high-pressure turbine in the case of medium exhaust gas flow rates is also supplied exclusively to the first channel of the low-pressure turbine. If the exhaust-gas flow rate increases further, the first bypass line is connected to both channels of the two-channel low-pressure turbine. For this purpose, the control element is moved from a first working position into a second working position.

The low-pressure turbine may be designed for the maximum exhaust-gas flow rate of the internal combustion engine, because a deterioration in supercharging behavior toward lower exhaust-gas flow rates, that is to say at medium exhaust-gas flow rates, is or may be avoided according to the present application by virtue of one of the two channels of the low-pressure turbine, in the present case the second channel, being deactivated in order to decrease the size of the overall flow cross section of the two channels, whereby exhaust gas with greater energy is provided at the inlet into the rotor.

By means of the internal combustion engine according to the present application, the first object on which the present application is based is achieved, that is to say a supercharged internal combustion engine as per the preamble of claim 1 is provided, the supercharging behavior of which is improved, with regard to the significant variation in exhaust-gas flow rates during operation.

According to the present application, an exhaust-gas recirculation arrangement is provided. To adhere to future threshold values for nitrogen oxide emissions, use is increasingly being made of exhaust-gas recirculation, that is to say the recirculation of exhaust gases from the exhaust-gas side to the intake side, wherein the nitrogen oxide emissions may be lowered considerably with increasing exhaust-gas recirculation rate. Here, the exhaust-gas recirculation rate xEGR is determined as follows:

$$x\text{EGR}=m\text{EGR}/(m\text{EGR}+m\text{Fresh air}),$$

where mEGR denotes the mass of recirculated exhaust gas and mFresh air denotes the fresh air or combustion air which is supplied—if appropriate having been conducted through and compressed by a compressor.

Exhaust-gas recirculation is also suitable for reducing the emissions of unburned hydrocarbons in the part-load range.

To obtain a considerable reduction in nitrogen oxide emissions, high exhaust-gas recirculation rates may be used, which may be of the order of magnitude of xEGR≈60% to 70%.

Further advantageous embodiments of the internal combustion engine according to the present application will be explained in conjunction with the subclaims.

Embodiments of the supercharged internal combustion engine may be advantageous in which the control element is a pivotable flap.

In this connection, embodiments of the supercharged internal combustion engine may be advantageous in which the flap, when opening up the first bypass line by means of a pivoting movement proceeding from the rest position in which the first bypass line is shut off, is pivoted with the exhaust-gas flow, that is to say in the flow direction. Then, if the flap develops a defect, it is pivoted by the exhaust-gas stream into the open position, in which the first bypass line is open, and the exhaust gas flows through both turbines.

Embodiments of the supercharged internal combustion engine may be advantageous in which the control element may be electrically, hydraulically, pneumatically, mechanically or magnetically controlled, optionally by means of an engine controller.

Embodiments of the supercharged internal combustion engine may be advantageous in which the control element is controllable, that is to say switchable, in a stepped fashion.

However, embodiments of the supercharged internal combustion engine may be advantageous in which the control element is continuously adjustable.

In this connection, embodiments of the supercharged internal combustion engine may be advantageous in which the control element is continuously adjustable at least in the first working position. The continuous adjustability of the control element in the first working position is of particular significance because it is then possible for the control element, proceeding from the rest position, to be opened further, that is to say adjusted further in the direction of the open position, with increasing exhaust-gas flow rate, such that on the one hand, the exhaust-gas flow rate conducted through the high-pressure turbine may be or is substantially maintained, and on the other hand, the exhaust-gas flow rate conducted past the high-pressure turbine may be increased in continuous fashion. Excessively intense torque fluctuations could otherwise arise, for example in the event of abrupt changes in the exhaust-gas flow rate conducted through the high-pressure turbine, for example as a result of stepped adjustment of the control element.

Nevertheless, embodiments of the supercharged internal combustion engine may also be advantageous in which, in the event of an exceedance of a particular exhaust-gas flow rate, the high-pressure turbine is deactivated and all of the exhaust gas is conducted through the low-pressure turbine, that is to say the low-pressure turbine is the only turbine into which exhaust gas is admitted.

Embodiments of the supercharged internal combustion engine may be advantageous in which the first compressor is designed to be larger than the second compressor, because the first compressor forms the low-pressure stage within the context of the two-stage compression, whereas the second compressor compresses the already pre-compressed charge air and thus constitutes the high-pressure stage.

For this reason, embodiments may be advantageous in which the first turbine is designed to be larger than the second turbine. This is because the second turbine serves as a high-pressure turbine, whereas the first turbine serves for expanding an exhaust-gas flow which is already at a relatively low pressure and has a relatively low density owing to the fact that it has already passed through the high-pressure stage.

Embodiments of the supercharged internal combustion engine may be advantageous in which the two-channel turbine is a dual-flow turbine.

Here, embodiments may be advantageous in which the two-channel turbine is a dual-flow turbine in which the two channels are arranged one on top of the other as viewed in a section perpendicular to the rotary axle of the at least one rotor and, at least along an arc-shaped segment, enclose the at least one rotor in spiral form at different radii.

A dual-flow turbine often exhibits greater efficiency, and improved flow impingement on the rotor, in relation to the twin-flow turbine. Furthermore, the dual-flow turbine may be subjected to greater thermal loading. The latter advantage emerges from the arrangement of the channels.

A dual-flow turbine has a turbine housing in which at least one rotor is mounted on a rotatable shaft. One embodiment of the dual-flow turbine is characterized in that the two channels are arranged one on top of the other and are open toward the rotor in each case along a circular-arc-shaped segment, for which reason said dual-flow turbines are also often referred to as segmented turbines.

If a dual-flow turbine is used, embodiments of the supercharged internal combustion engine may be advantageous in which the second turbine is connected via an exhaust line to the inner channel of the dual-flow turbine. The inner channel has the smaller radius around the rotary axle of the rotor and the smaller volume as measured from the inlet region into the turbine to the rotor. Therefore, the exhaust gas originating, that is to say passing, from the high-pressure turbine exhibits greater enthalpy upon entry into the rotor if it is conducted to the rotor via the inner channel and not by the outer channel.

Embodiments of the supercharged internal combustion engine may however also be advantageous in which the two-channel turbine is a twin-flow turbine.

Here, embodiments may be advantageous in which the two-channel turbine is a twin-flow turbine in which the two channels are arranged adjacent to one another and, at least along an arc-shaped segment, enclose the at least one rotor in spiral form at equal radii.

Embodiments of the supercharged internal combustion engine may be advantageous in which the two channels are separated from one another as far as the at least one rotor by means of a housing wall. The housing wall of the turbine housing has, at the rotor side, a free tongue-like end which, in the present case, extends to a point as close to the at least one rotor as possible. This maximizes the degree of separation of the channels. A gap of greater or lesser size between the housing wall and the at least one rotor remains in order that the rotor may rotate unhindered without rubbing against the housing wall. Said gap should however be designed to be as narrow as possible in the present case.

In this context, embodiments of the supercharged internal combustion engine may be advantageous in which the housing wall is an immovable wall that is fixedly connected to the housing. Said embodiment of the housing wall better enables that the heat introduced into the housing wall by the hot exhaust gas is discharged into and via the housing in an advantageous manner and to an adequate extent.

Here, embodiments of the supercharged internal combustion engine may be advantageous in which the housing wall has at least one flow transfer opening or a perforation, such that a transfer of flow, or interaction, between the channels is possible.

For this reason, embodiments of the supercharged internal combustion engine may be also advantageous in which the two channels are separated from one another at least in sections by means of a housing wall, wherein the housing wall has, at the rotor side, a free tongue-like end and ends with a spacing to the at least one rotor, such that a tongue spacing is formed. In the present case, interaction between the channels is permitted. The channels may communicate with one another upstream of the at least one rotor.

In this context, embodiments of the supercharged internal combustion engine may be advantageous in which the tongue-like end is of variable form for the purpose of variation of the tongue spacing, for example, the tongue-like end may be lengthened in the direction of the rotors for the purpose of decreasing the tongue spacing.

Embodiments of the supercharged internal combustion engine may be advantageous in which a second bypass line is provided which branches off from the exhaust-gas discharge system upstream of the first turbine. Here, embodiments of the supercharged internal combustion engine may be advantageous in which said second bypass line opens into the exhaust-gas discharge system again downstream of the first turbine. The fact that the bypass line opens into the exhaust-gas discharge system again has the advantage that, then, all of the exhaust gas may be supplied to an exhaust-gas aftertreatment system provided in the exhaust-gas discharge system.

Embodiments of the supercharged internal combustion engine may be advantageous in which an exhaust-gas recirculation arrangement is provided which comprises a line which branches off from the exhaust-gas discharge system upstream of the two turbines and issues into the intake system, optionally downstream of the compressors.

Embodiments may be advantageous in which an additional cooler is provided in the line for exhaust-gas recirculation. Said additional cooler lowers the temperature in the hot exhaust-gas flow and thereby increases the density of the exhaust gases. The temperature of the cylinder fresh charge which results upon the mixing of the fresh air with the recirculated exhaust gases is consequently further reduced in this way, as a result of which the additional cooler also contributes to improved charging of the combustion chamber with fresh mixture.

Embodiments may be advantageous in which a shut-off element is provided in the line for exhaust-gas recirculation. Said shut-off element serves for the control of the exhaust-gas recirculation rate.

Embodiments of the supercharged internal combustion engine may be also advantageous in which an exhaust-gas recirculation arrangement is provided which comprises a line which branches off from the exhaust-gas discharge system downstream of the two turbines and issues into the intake system, optionally upstream of the compressors.

In contrast to the abovementioned high-pressure EGR arrangement, in which exhaust gas is extracted from the exhaust-gas discharge system upstream of the turbines and introduced into the intake system downstream of the compressors, in the case of a low-pressure EGR arrangement exhaust gas which has already flowed through the turbines is recirculated to the inlet side. For this purpose, the low-pressure EGR arrangement comprises a recirculation line which branches off from the exhaust-gas discharge system downstream of the turbines and issues into the intake system upstream of the compressors.

The exhaust gas which is recirculated via the low-pressure EGR arrangement to the inlet side, and optionally cooled, is mixed with fresh air upstream of the compressors. The mixture of fresh air and recirculated exhaust gas produced in this way forms the charge air which is supplied to the compressors and compressed.

Here, it is not disadvantageous that exhaust gas is conducted through the compressors during the course of the low-pressure EGR, because in general exhaust gas is used which has been subjected to exhaust-gas aftertreatment, for example in the particle filter, downstream of the turbines. There is therefore no risk of depositions in the compressor which change the geometry of the compressor, for example the flow cross sections, and thereby decrease the efficiency of the compressor.

Embodiments of the supercharged internal combustion engine may be advantageous in which the second turbine of the second exhaust-gas turbocharger has a variable turbine geometry.

A variable turbine geometry increases the flexibility of the supercharging. It permits a continuously variable adaptation of the turbine geometry to the respective operating point of the internal combustion engine, for example to the present exhaust-gas flow. By contrast to a turbine with a fixed geometry, there is no need to come to a compromise in designing the turbine in order to realize more or less satisfactory supercharging in all engine speed and load ranges.

The combination of a turbine with variable turbine geometry and a bypass line that bypasses said turbine makes it possible for the high-pressure turbine to be designed for very small exhaust-gas flows and thus for the lower part-load range. Consequently, high turbine pressure ratios may be achieved even in the presence of low engine speeds or very low exhaust-gas mass flow rates.

Embodiments of the supercharged internal combustion engine may be advantageous in which a third bypass line is provided which branches off from the intake system downstream of the first compressor and in which a shut-off element is arranged. Said bypass line may serve for charge-air blow-off and may open into the intake system again upstream of the first compressor, whereby the fresh air compressed in the first compressor is not blown off but is rather merely recirculated. A shut-off element is provided in the bypass line for the purpose of controlling the blown-off or recirculated fresh-air flow rate.

Said third bypass line may however also serve for the induction of fresh air, specifically in situations in which the second, relatively small turbine performs the major proportion of the compressor work and the first compressor merely constitutes a flow resistance for the fresh air drawn in by the second compressor.

Embodiments of the supercharged internal combustion engine may be advantageous in which a fourth bypass line is provided which branches off from the intake system upstream of the second compressor and which opens into the intake system again downstream of the compressor. In said bypass line, there is arranged a shut-off element which is opened if the second compressor is to be deactivated.

Embodiments of the supercharged internal combustion engine may be advantageous in which a charge-air cooler is arranged in the intake line downstream of the compressors. The charge-air cooler lowers the air temperature and thereby increases the density of the charge air, as a result of which the cooler also contributes to improved charging of the combustion chamber with air, that is to say to a greater air mass.

In the case of supercharged internal combustion engines having at least two cylinders, in which each cylinder has at least one outlet opening for the discharge of the exhaust gases out of the cylinder and each outlet opening is adjoined by an exhaust line, embodiments may be advantageous which may be distinguished by the fact that the exhaust lines of at least two cylinders merge within the cylinder head to form an integrated exhaust manifold.

The turbines may then be arranged very close to the outlet of the internal combustion engine, that is to say close to the outlet openings of the cylinders. This has the advantage that the exhaust-gas enthalpy may be optimally utilized, and a fast response behavior of the turbines may be better enabled.

The integration of the exhaust manifolds into the cylinder head furthermore results in a compact design of the cylinder head and thus of the internal combustion engine according to the present application, and permits dense packaging of the drive unit as a whole. Furthermore, in this way, said exhaust manifolds may benefit from a liquid-type cooling arrangement that may be provided in the cylinder head, such that the manifolds do not need to be manufactured from thermally highly loadable and thus expensive materials.

Embodiments of the supercharged internal combustion engine may be advantageous in which a control element may be provided by which the second turbine may be deactivated, for example in the event of a certain exhaust-gas flow rate being exceeded. Then, all of the exhaust gas is conducted through the low-pressure turbine, and the low-pressure turbine is the only turbine into which exhaust gas is admitted.

The second sub-object on which the present application is based, specifically that of specifying a method for operating a supercharged internal combustion engine of a type described above, is achieved by means of a method which is distinguished by the fact that the control element is moved from the rest position into a first working position if the exhaust-gas flow rate exceeds a first predefinable exhaust-gas flow rate.

That which has been stated in connection with the internal combustion engine according to the present application likewise applies to the method according to the present application.

In a non-supercharged internal combustion engine, the exhaust-gas flow rate corresponds approximately to the engine speed and/or load of the internal combustion engine, specifically as a function of the load control used in the individual situation. In a traditional Otto-cycle engine with quantity regulation, the exhaust-gas flow rate increases with increasing load even at a constant engine speed, whereas in traditional diesel engines with quality regulation, the exhaust-gas flow rate is dependent merely on engine speed, because in the event of a load shift at constant engine speed, the mixture composition but not the mixture quantity is varied.

If an internal combustion engine with quantity regulation is used in which the load is controlled by means of the flow rate of fresh mixture, the approach according to the present application in the operation of said internal combustion engine means that the control element is moved from the rest position into a first working position if—assuming a fixed engine speed—the load of the internal combustion engine exceeds a first predefinable load, since the exhaust-gas flow rate in an internal combustion engine of said type corresponds to the load, and the exhaust-gas flow rate rises with increasing load and falls with decreasing load. Furthermore, the control element is moved from the rest position into a first working position if the engine speed of the Otto-cycle engine exceeds a first predefinable engine speed, because the exhaust-gas flow rate rises with increasing engine speed and falls with decreasing engine speed, independently of the load control used in the individual situation.

If, in contrast, the internal combustion engine is based on quality regulation, in which the load is controlled by means of the composition of the fresh mixture and the exhaust-gas flow rate varies virtually exclusively with engine speed, that is to say is proportional to the engine speed, then in the method according to the present application for operating said internal combustion engine, the control element is moved from the rest position into a first working position, in a manner independent of load, if the engine speed of the internal combustion engine exceeds a first predefinable engine speed, since in the present case, the exhaust-gas flow rate rises with increasing engine speed and falls with decreasing engine speed.

If the internal combustion engine is one which is supercharged—for example by means of exhaust-gas turbocharging—it additionally is taken into consideration that the charge pressure on the inlet side may vary with the load and/or engine speed, and influences the exhaust-gas flow rate. The relationships presented in simplified form above between the exhaust-gas flow rate and the load or engine speed then consequently do not apply in said general form. The method according to the present application is therefore geared very generally to the exhaust-gas flow rate and not to the load or engine speed. The control element is therefore moved from the rest position into a first working position if the exhaust-gas flow rate exceeds a first predefinable exhaust-gas flow rate.

Method variants may be advantageous in which the control element is moved from the rest position into a first working position if the exhaust-gas flow rate exceeds the first predefinable exhaust-gas flow rate and is greater than said first predefinable exhaust-gas flow rate for a predefinable time period $\Delta t1$.

The introduction of an additional condition is intended to reduce an excessively frequent change between the positions, for example if the exhaust-gas flow rate briefly exceeds the first predefinable exhaust-gas flow rate and then falls again or fluctuates around the first predefinable value for the exhaust-gas flow rate, without the exceedance justifying a transition to a first working position.

Method variants may be advantageous in which the control element is opened further within the first working position with increasing exhaust-gas flow rate.

Method variants may be advantageous in which the control element is moved from a first working position into a second working position if the exhaust-gas flow rate exceeds a second predefinable exhaust-gas flow rate.

For reasons already mentioned above, method variants may be advantageous in which the control element is moved from a first working position into a second working position if the exhaust-gas flow rate exceeds the second predefinable exhaust-gas flow rate and is greater than said second predefinable exhaust-gas flow rate for a predefinable time period $\Delta t2$.

Method variants may be advantageous in which the second turbine, that is to say the high-pressure turbine, is deactivated if the exhaust-gas flow rate exceeds a third predefinable exhaust-gas flow rate.

The present application will be described in more detail below on the basis of an exemplary embodiment according to the figures.

Figure 1A:
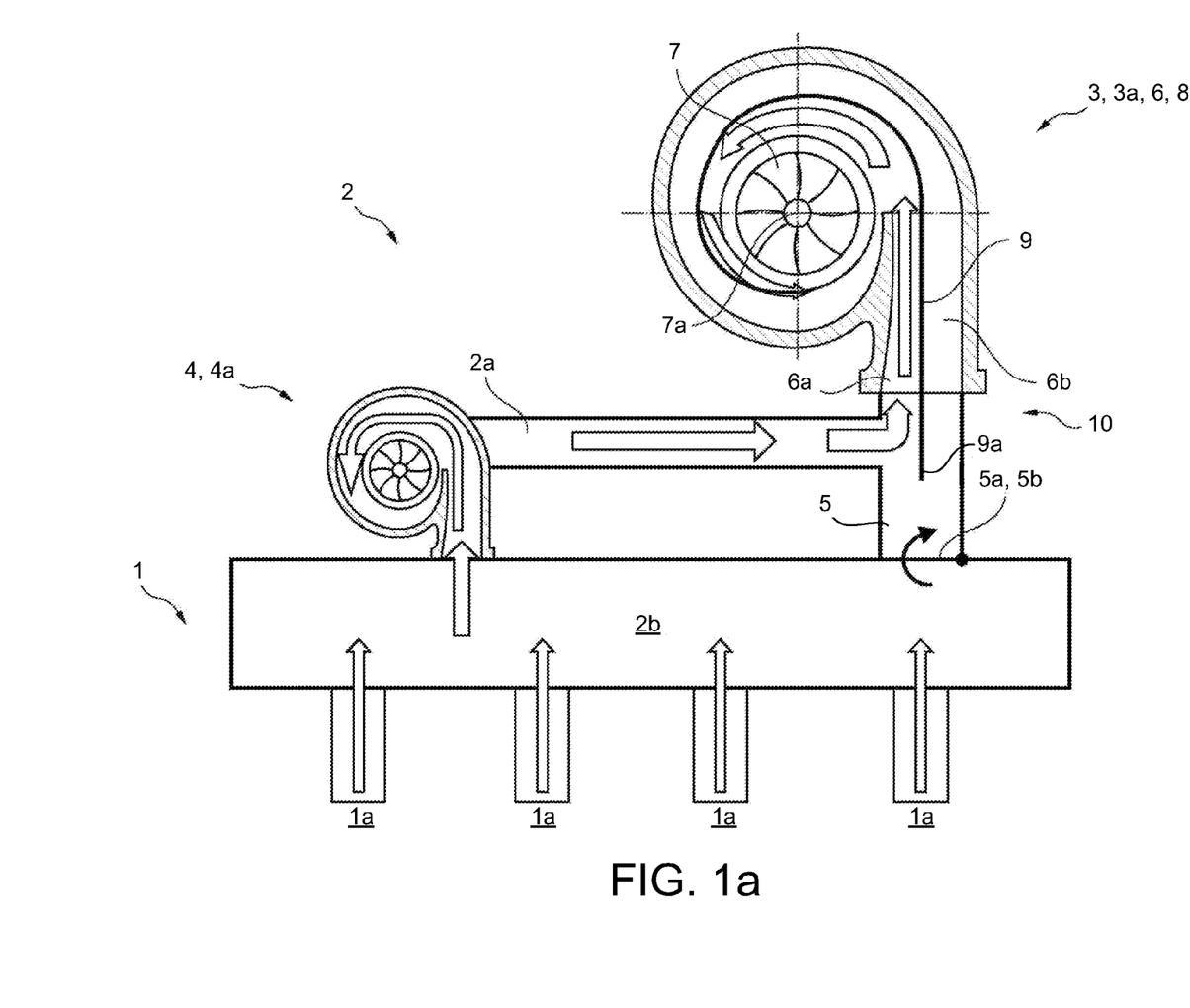
FIG. 1a schematically shows the exhaust-gas discharge system of a first embodiment of the supercharged internal combustion engine with the control element in the rest position.

FIG. 1a schematically shows the exhaust-gas discharge system 2 of a first embodiment of the supercharged internal combustion engine 1 with the control element 5a in the rest position. The four cylinders 1a of the internal combustion engine 1 (not illustrated) have in each case one exhaust line for discharging the hot combustion gases, wherein the exhaust lines of the cylinders 1a merge to form an exhaust manifold 2b, whereby the exhaust lines of the cylinders 1a are connected to one another and are part of the common exhaust-gas discharge system 2.

The internal combustion engine 1 is equipped with two turbines 3a, 4a arranged in series in the exhaust-gas discharge system 2, wherein each turbine 3a, 4a belongs to an exhaust-gas turbocharger 3, 4, of which a first exhaust-gas turbocharger 3 serves as a low-pressure stage 3 and a second exhaust-gas turbocharger 4 serves as a high-pressure stage 4. For this reason, the first turbine 3a is also designed to be larger than the second turbine 4a, because the second turbine 4a serves as a high-pressure turbine 4a, whereas the first turbine 3a serves for expanding an exhaust-gas stream which is possibly at a relatively low pressure, with a relatively low density, owing to the fact that it has passed through the high-pressure stage 4.

A first bypass line 5 is provided which branches off from the exhaust-gas discharge system 2 upstream of the second turbine 4a, specifically in the present case from the exhaust manifold 2b, and which issues into the exhaust-gas discharge system 2 again upstream of the first turbine 3a. A control element 5a serves for metering the exhaust-gas flow rate that is conducted via the bypass line 5. As a control element 5a, there is provided a pivotable flap 5b which may be continuously adjustable, at least in a first working position.

The illustrated concept of the turbines 3a, 4a arranged in series is distinguished by the fact that the first turbine 3a, that is to say the low-pressure turbine 3a, is a two-channel turbine 6, and the second turbine 4a, that is to say the high-pressure turbine 4a, is connected via an exhaust line 2a to only one channel 6a of said two-channel turbine 6, wherein said channel 6a is referred to as first channel 6a.

In the present case, the two-channel turbine 6 is a dual-flow turbine 8 in which, in the section perpendicular to the rotary axle 7a of the rotor 7, as shown in FIG. 1a, the two channels 6a, 6b are arranged one on top of the other and, along an arc-shaped segment, enclose the rotor 7 in spiral form at different radii. The dual-flow turbine 8 consequently has an inner channel 6a and an outer channel 6b; this may be seen from FIG. 1a. The two channels 6a, 6b are separated from one another as far as the rotor 7 by means of a housing wall 9 and are open toward the rotor 7 in each case along a circular-arc-shaped segment, whereby the illustrated dual-flow turbine 8 is a segmented turbine.

The second turbine 4a is connected via an exhaust line 2a to the inner channel 6a of the dual-flow turbine 8, said inner channel having the smaller radius about the rotary axle 7a of the rotor 7 and the smaller volume as measured from the inlet region 10 into the turbine 3a, 6, 8 to the rotor 7. The exhaust gas that is conducted through the inner channel 6a thus exhibits higher enthalpy upon entry into the rotor 7. For example, at low engine speeds, the control element 5a is fully closed and the exhaust gas from the exhaust manifold is flowed to the second exhaust-gas turbocharger 4, through the exhaust line 2a to the first channel 6a of the first exhaust-gas turbocharger 3, as illustrated by the arrows in the schematic. Thus, exhaust gas is flowed through one of the channels of the two-channel turbine 6. Therefore, the first channel 6a and second channel 6b experience different exhaust gas flow rates and exhaust gas compositions since the exhaust gas is being flowed through the first channel 6a only when the control element 5a is fully closed and the second channel receives no exhaust gas flow. Thus, the rotor of the low-pressure turbine is acted upon by exhaust gas flowing through the first channel only.

Figure 1B:
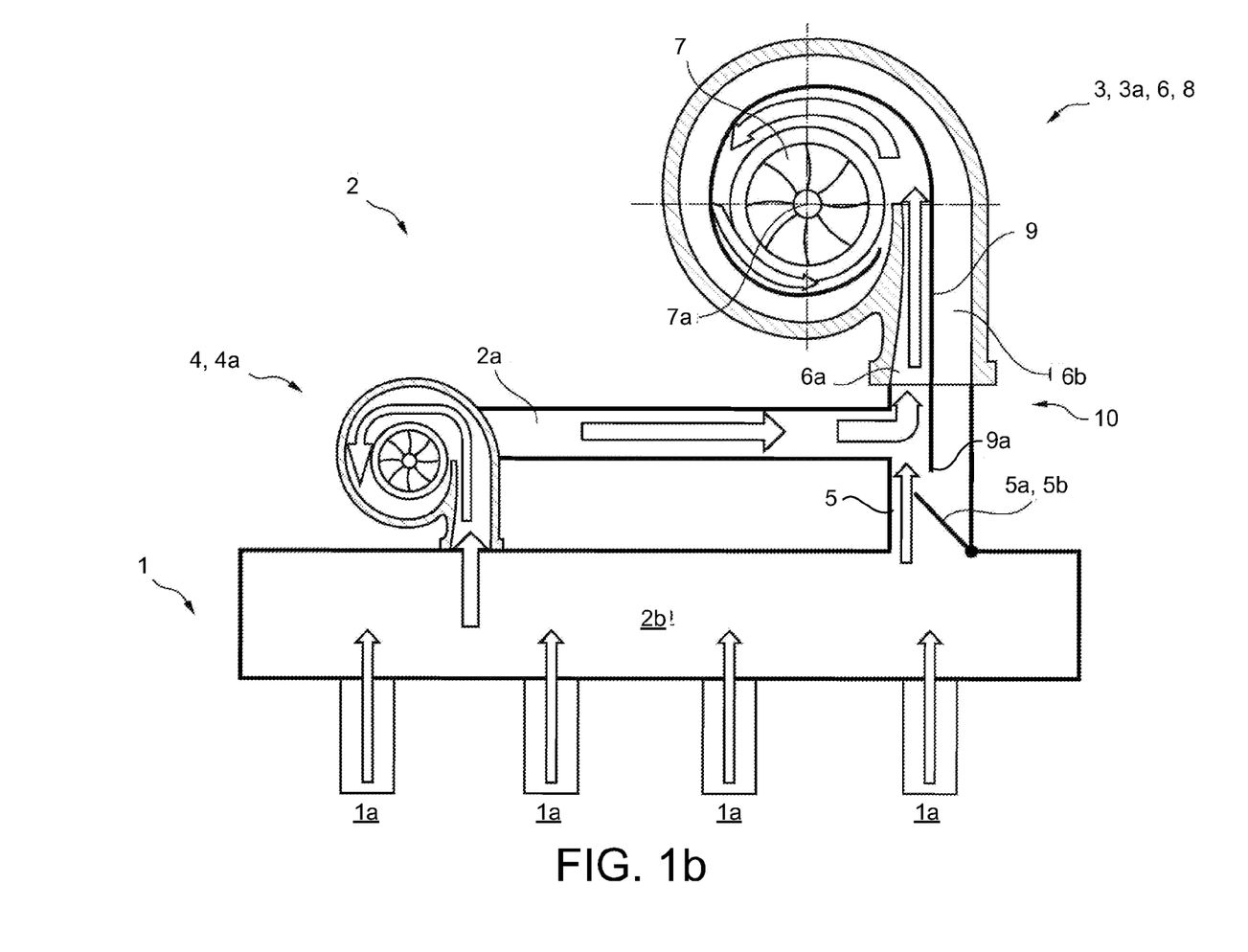
FIG. 1b schematically shows the exhaust-gas discharge system of the first embodiment illustrated in FIG. 1a with the control element in a first working position.
Figure 1C:
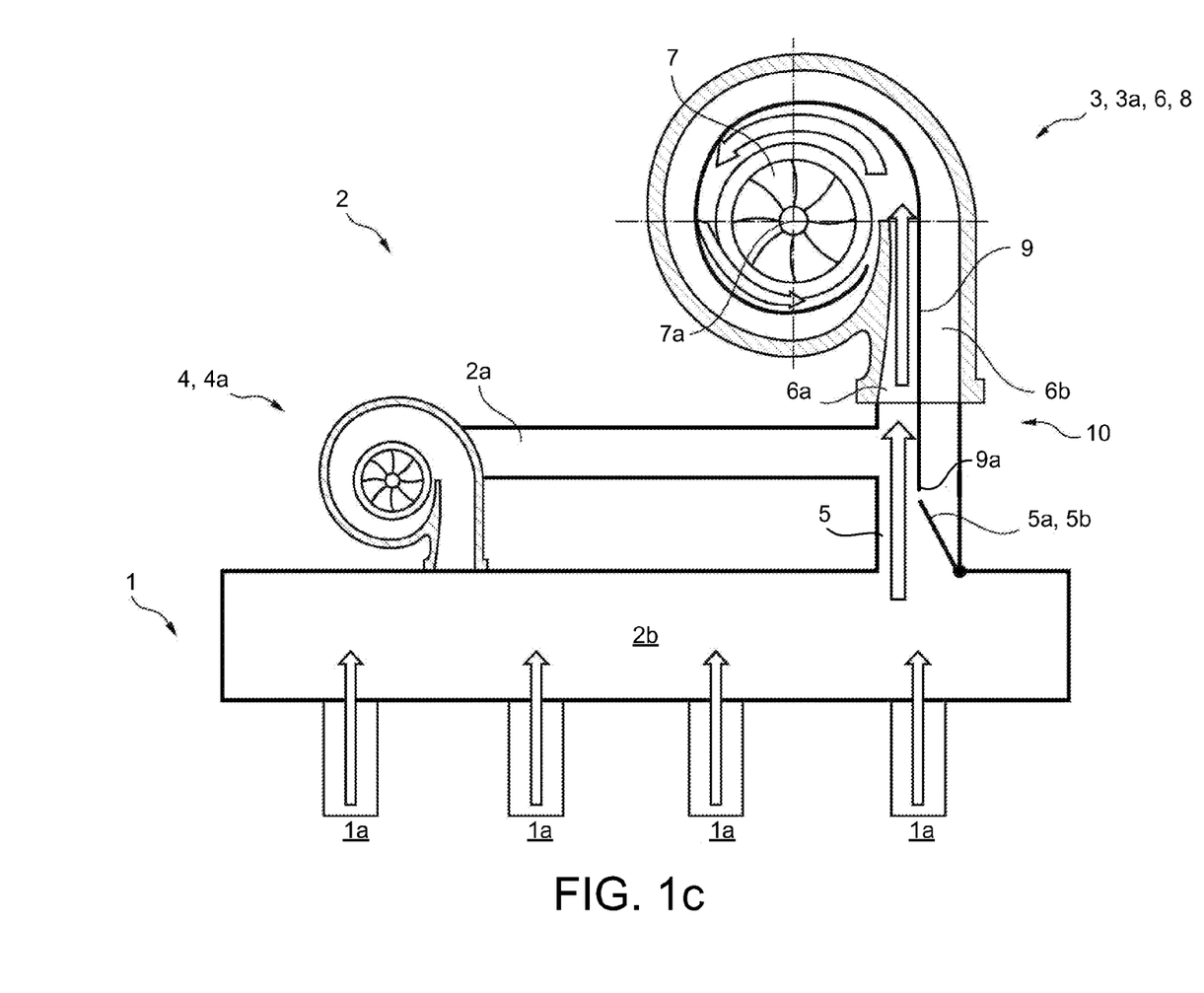
FIG. 1c schematically shows the exhaust-gas discharge system of the first embodiment illustrated in FIG. 1a with the control element in a further first working position.
Figure 1D:
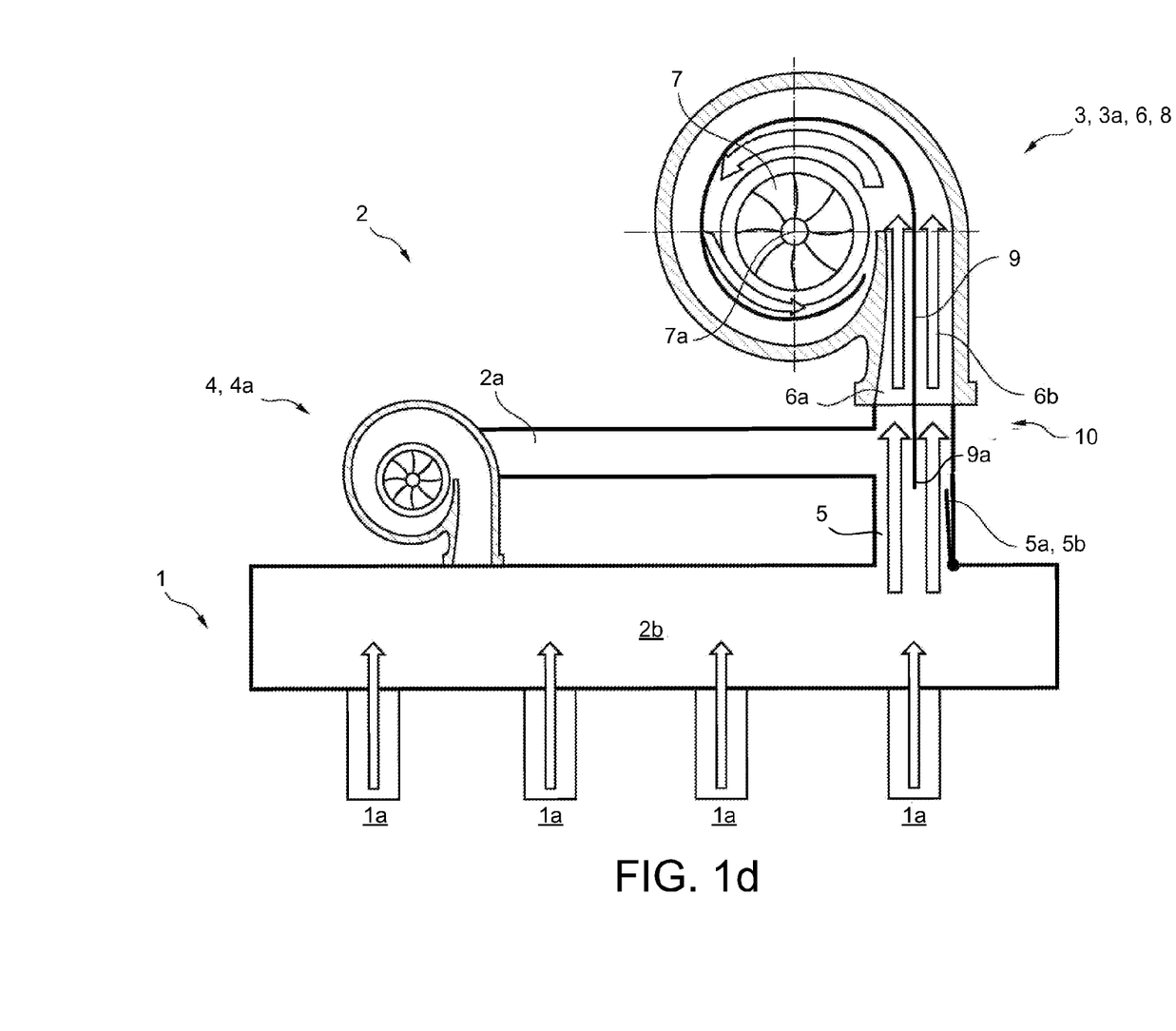
FIG. 1d schematically shows the exhaust-gas discharge system of the first embodiment illustrated in FIG. 1a with the control element in a second working position.

The first bypass line 5, which bypasses the high-pressure turbine 4a, is connectable to both channels 6a, 6b of the dual-flow turbine 8, the control element 5a blocking the first bypass line 5 when in a rest position (see FIG. 1a), connecting the first bypass line 5 to the first channel 6a of the dual-flow turbine 8 when in a first working position (see FIGS. 1b and 1c), and connecting the first bypass line 5 to both channels 6a, 6b of the dual-flow turbine 8 when in a second working position, (see FIG. 1d).

FIGS. 1b and 1c schematically show the exhaust-gas discharge system 2 of the first embodiment illustrated in FIG. 1a with the control element 5a in the first working position, FIG. 1d schematically shows the exhaust-gas discharge system 2 with the control element 5a in a second working position. It is the intention to briefly discuss the differences between the different positions illustrated. Reference is otherwise made to FIG. 1a and the associated description. The same reference symbols have been used for the same components.

In the rest position illustrated in FIG. 1a, the flap 5b which serves as control element 5a shuts off the first bypass line 5, such that all of the exhaust gas from the internal combustion engine 1 flows through the high-pressure turbine 4a and then through the first channel 6a of the low-pressure turbine 3a.

If the exhaust-gas flow rate exceeds a predefinable exhaust-gas flow rate, the flap 5b is moved from the rest position into a first working position as illustrated in FIG. 1b, whereby the first bypass line 5 is enabled, that is to say opened. In said first working position, the bypass line 5 is connected to the first channel 6a of the dual-flow turbine 8. If the exhaust-gas flow rate increases further, the first bypass line 5 is opened further within the first working position by virtue of the flap 5b being pivoted further, as illustrated in FIG. 1c. The flap 5b may be continuously variable in the first position to optimize the exhaust flow rate through the high-pressure turbine 4a and the first channel 6a of the low-pressure turbine 3a. The exhaust gas flows through the first channel 6a from two sources and no exhaust gas flows through the second channel 6b when the flap 5b is in the first position. Thus, the first channel of the low-pressure turbine receives exhaust gas from the bypass line and the high-pressure turbine, which then enacts on the rotor of the low-pressure turbine.

The first position of the control element 5a may be positioned responsive to the exhaust gas flow rate above the first threshold and below a second threshold, wherein the position is adjusting to optimize charging of the internal combustion engine. The control element may be opened slightly, a partially opened position, from the fully closed position (the rest position) and be continuously varied to a fully opened position where the flap 5b shows a minimal separation to the housing wall end 9a of the housing wall 9 in the turbine in the inlet region 10 of the bypass line 5. Thus, the position of the control element creates minimal separation between the housing wall end 9a in the bypass channel such that the gap between the end of the control element 5a and housing wall end 9a is very small. The first position of the control element 5a allows exhaust gas to flow through the bypass line 5 to the first channel 6a of the low-pressure turbine, illustrated by the arrows in FIGS. 1b and 1c. The second channel is blocked by the flap when the control element is in the first position.

If the exhaust-gas flow rate increases yet further, the flap 5b is moved, by being pivoted further, into a second working position in which the first bypass line 5 is connected to both channels 6a, 6b of the two-channel low-pressure turbine. For example, the exhaust gas flows from the exhaust manifold 2b through the first bypass line 5 to the first channel 6a and second channel 6b of the low-pressure turbine 3a. All of the exhaust gas flowing through both the first 6a and second 6b channels has the same pressure and composition when the flap 5b is fully opened in the second position. In one example, the high-pressure turbine 4 may be deactivated such that no exhaust gas flows through the high-pressure turbine 4 when the control element 5a is in the second working position. Thus, a control valve (not shown) may be used to deactivate the high-pressure turbine 4. In yet another example, the high-pressure turbine 4 may not be deactivated and an amount of exhaust gas may flow through the high-pressure turbine when the control element is in the second position. Thus, the exhaust-gas flow rate conducted through the high-pressure turbine may be or is substantially maintained.

In this example case, in FIGS. 1c and 1d, the high-pressure turbine 4a is deactivated, wherein all of the exhaust gas is conducted through the low-pressure turbine 3a. For example, a control valve may be included to block exhaust gas flow through the high-pressure turbine 4a. However, in another example, the high-pressure turbine is not deactivated, such that the relatively small high-pressure turbine 4a may by all means contribute to the generation of the charge pressure on the inlet side even in the presence of relatively high exhaust-gas flow rates.

Figure 2:
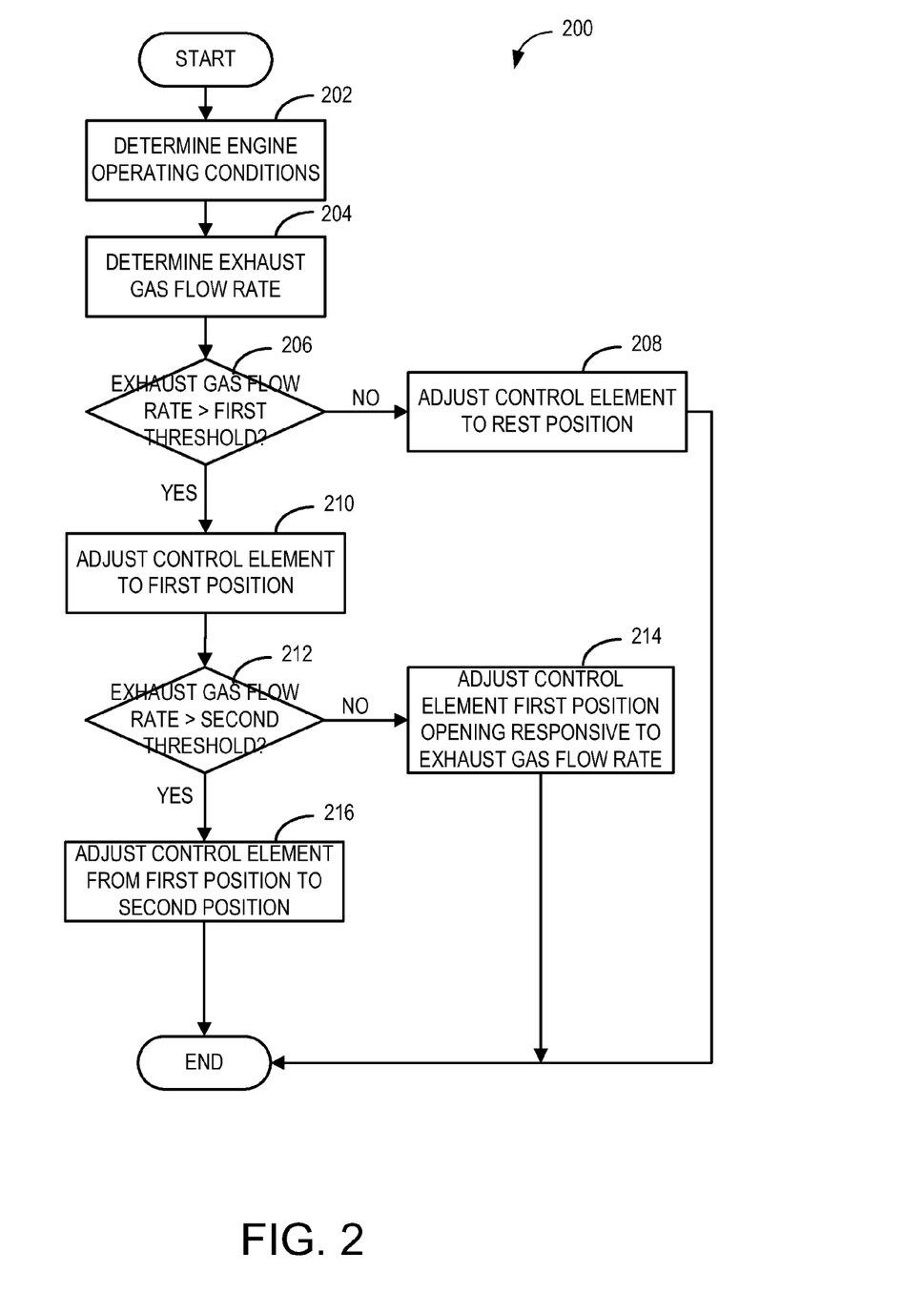
FIG. 2 shows an example method to adjust the control element in response to the exhaust flow rate.

Turning to FIG. 2, an example method 200 is outlined to adjust the control element responsive to the exhaust gas flow rate over a threshold in a turbocharged internal combustion engine. The control element in the bypass line is adjusted to fluidly connect the exhaust-gas discharge line to the first and the second channel of the low-pressure turbine. In another example, the control element may be adjusted in response to engine speed and/or engine load.

At 202 the method may determine the engine operating conditions. This may include engine speed, engine load, charge pressure on inlet side, etc.

At 204 the method may determine the exhaust gas flow rate based on the engine operating conditions determined at 202. The method may further determine if the engine used is with quantity regulation, quality regulation, etc. in order to determine the exhaust gas flow rate.

At 206, the method may determine if the exhaust gas flow rate is greater than a first threshold. The first threshold may be set based on the upper exhaust gas flow threshold of the high-pressure turbine. If no, the exhaust gas flow rate is below the first threshold, the method adjusts the control element to the rest position at 208. Adjusting the control element to the rest position flows exhaust gas through the high-pressure turbine and then to the first channel of the low-pressure turbine at low exhaust gas flow rates. This optimizes charging behavior at relatively low exhaust flow rates by flowing the exhaust gas from the high-pressure turbine with a greater energy to the low-pressure turbine since the single channel of the high-pressure turbine has a smaller cross-section than the first channel of the low-pressure turbine. The control element in the rest position is fully closed and blocks exhaust gas flow through the bypass line. Thus, all of the exhaust gas passes through the high-pressure turbine before passing through only the first channel of the low-pressure turbine.

If the exhaust gas flow rate is above the first threshold at 206, the method may proceed to 210 and adjust the control element to the first position. The first position of the control element opens the bypass line to allow exhaust flow from the exhaust manifold through the first channel of the low-pressure turbine as well as allowing exhaust gas to flow from to the high-pressure turbine and then through the first channel. Thus, the exhaust gas flow acts on the rotor of the low-pressure turbine from only the first channel and the first channel receives exhaust gas flow from both the high-pressure turbine and the bypass line.

At 212, the method may determine if the exhaust gas flow rate is above a second threshold. The second threshold may be based on the upper exhaust gas flow threshold of the first channel of the first turbine. If no, the exhaust gas flow rate is below the second threshold, the method may proceed to 214 and adjust the control elements first position opening responsive to the exhaust gas flow rate. This allows the control element to be positioned in a way to optimize charging behavior based on the exhaust gas flow rate by adjusting the control element to a position which controls the exhaust flow rate through the bypass to the first channel of the low-pressure turbine. The first position of the control element may be continuously variable. The first position only allows exhaust gas flow through the bypass to the first channel; the second channel is still blocked.

If yes, the exhaust gas flow rate is greater than the second threshold at 212, the method may proceed to 216 and adjust the control element from the first position to the second position. The second position of the control element flows exhaust gas through both channels of the low-pressure turbine from the exhaust manifold and bypass line. Thus, all of the exhaust gas from the cylinders of the engine are mixed in the exhaust manifold and flowed through both channels of the low-pressure turbine. Therefore, each channel is acted upon by the same exhaust gas flow rate and composition. In this example, the high-pressure turbine may be blocked with a valve when the control element is in the second position. In another example, the high-pressure turbine may not have a valve and an amount of exhaust gas may flow through the high-pressure turbine when the control element is in the second position. The method may then end.

In this way, the performance of a series arrangement of turbochargers may be optimized for the engine operating conditions by adjusting a control element in a bypass line. This allows for the compressors and turbines to be sized to utilize given upper and lower exhaust gas flow rate thresholds of the system by selectively flowing exhaust gas from the exhaust manifold to the high-pressure turbine and the two channels of the low-pressure turbine using the control element. Therefore, the charging of the internal combustion engine may be optimized.

In one example, the above examples illustrated a method, comprising: during a first mode, directing exhaust through a first turbine and then through only a first channel of a second turbine; during a second mode, directing exhaust through the first turbine and then through the first channel of the second turbine while directing exhaust in parallel through a second channel of the second turbine; during a third mode, directing exhaust through only the second channel and not through the first turbine, and during a fourth mode, directing exhaust through only the first and second channels of the second turbine and not through the first turbine. In one example, during the first mode no exhaust flows through the second channel of the second turbine, and wherein during the second mode no exhaust flows through the second channel of the second turbine, wherein the first turbine has only a single channel, wherein the first, second, third, and fourth modes are carried out mutually exclusively and operation transitions between the modes by adjusting a valve upstream of the second turbine in a passage in parallel with the first turbine. Further, in one example, during the second mode the valve may be adjusted to vary the amount of flow flowing in parallel to the first turbine and leading to the first channel to be more or less, but greater than zero, without any flow entering the first turbine passing by the valve. Likewise, during the fourth mode the valve may be adjusted to vary the amount of flow flowing in parallel to the first turbine and leading to the second channel to be more or less, but greater than zero, again without any flow leading to the first turbine passing by the valve, and without restricting the flow leading to the first channel of the second turbine.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine, comprising:
   an intake system for the supply of charge air;
   an exhaust-gas discharge system for the discharge of exhaust gas;
   at least two series-connected exhaust-gas turbochargers which each comprise a turbine, arranged in the exhaust-gas discharge system, and a compressor, arranged in the intake system, and of which a first exhaust-gas turbocharger serves as a low-pressure stage and a second exhaust-gas turbocharger serves as a high-pressure stage;
   a second turbine of the second exhaust-gas turbocharger being arranged upstream of a first turbine of the first exhaust-gas turbocharger, and a second compressor of the second exhaust-gas turbocharger being arranged downstream of a first compressor of the first exhaust-gas turbocharger;
   a first bypass line provided which branches off from the exhaust-gas discharge system upstream of the second turbine and which issues into the exhaust-gas discharge system upstream of the first turbine;
   a control element provided for metering an exhaust-gas flow rate that is conducted via the first bypass line;
   an exhaust-gas recirculation arrangement being provided;
   wherein the first turbine is a two-channel turbine which comprises at least one rotor mounted on a rotatable shaft in a turbine housing, and wherein the first turbine comprises an inner first channel and an outer second channel, wherein the inner first channel has a smaller radius around a rotational axis of the rotor and a smaller volume than the outer second channel;

the second turbine is connected via an exhaust line to the first channel of the two-channel turbine; and the first bypass line is connectable to both channels of the two-channel turbine, the control element blocking the first bypass line when in a rest position when exhaust gas flow is below a lower first threshold, connecting the first bypass line to the first channel of the two-channel turbine when in a first working position when exhaust gas flow is between the lower first threshold and a higher second threshold, and connecting the first bypass line to both channels of the two-channel turbine when in a second working position when exhaust gas flow is greater than the higher second threshold.

2. The supercharged internal combustion engine as claimed in claim 1, wherein the control element is a pivotable flap.

3. The supercharged internal combustion engine as claimed in claim 1, wherein the control element is continuously adjustable.

4. The supercharged internal combustion engine as claimed in claim 1, wherein the control element is continuously adjustable at least between the rest position and the first working position.

5. The supercharged internal combustion engine as claimed in claim 1, wherein the first compressor is designed to be larger than the second compressor.

6. The supercharged internal combustion engine as claimed in claim 1, wherein the first turbine is designed to be larger than the second turbine.

7. The supercharged internal combustion engine as claimed claim 1, wherein the two-channel turbine is a dual-flow turbine in which the two channels are arranged one on top of the other as viewed in a section perpendicular to the rotational axis of the at least one rotor and, at least along an arc-shaped segment, enclose the at least one rotor in spiral form at different radii.

8. The supercharged internal combustion engine as claimed in claim 1, wherein the two-channel turbine is a twin-flow turbine in which the two channels are arranged adjacent to one another and, at least along an arc-shaped segment, enclose the at least one rotor in spiral form at equal radii.

9. The supercharged internal combustion engine as claimed in claim 1, wherein the two channels are separated from one another as far as the at least one rotor by means of a housing wall, wherein the housing wall has, at the rotor side, a free tongue-like end and ends with a spacing to the at least one rotor, such that a tongue spacing is formed.

10. The supercharged internal combustion engine as claimed in claim 1, wherein a second bypass line is provided which branches off from the exhaust-gas discharge system upstream of the first turbine and opens downstream of the first turbine.

11. The supercharged internal combustion engine as claimed in claim 1, having at least two cylinders, wherein each cylinder has at least one outlet opening for the discharge of the exhaust gases from the cylinder, and each outlet opening is adjoined by an exhaust line, wherein the exhaust lines of the at least two cylinders merge within the cylinder head to form an integrated exhaust manifold.

12. The supercharged internal combustion engine as claimed in claim 1, wherein a control valve is provided by which the second turbine can be deactivated.

13. A method, comprising:
controlling a turbocharged engine having a second turbine positioned upstream of a first two-channel turbine, the second turbine fluidly connected to only a first channel of the first turbine, and a bypass line which branches upstream of the second turbine and is fluidly connectable to both channels via a valve, including:
closing the valve when an exhaust gas flow rate is less than a lower first threshold;
adjusting the valve between a rest position and a first position to fluidly connect the bypass line to the first channel of the first turbine responsive to the exhaust gas flow rate a increasing above the lower first threshold and remaining below a higher second threshold; and
adjusting the valve between the first position and a fully open second position to fluidly connect the bypass line to the first channel and a second channel of the first turbine responsive to the exhaust gas flow rate increasing above the higher second threshold.

14. The method as claimed in claim 13, wherein the valve is continuously adjustable between the rest position and the first position.

15. The method as claimed in claim 13, further comprising adjusting the valve to the first position when the exhaust gas flow rate is above the first threshold for a time period.

16. The method as claimed in claim 13, wherein the valve is adjusted to the second position to fluidly connect the first channel and the second channel to the bypass line when the exhaust gas flow rate is above the second threshold, the method further comprising adjusting the valve to the second position when the exhaust gas flow rate is above the second threshold for a time period.

17. A method, comprising:
during a first mode, directing exhaust through a first turbine and then through only a first channel of a second turbine;
during a second mode, directing exhaust through the first turbine and then through the first channel of the second turbine while directing exhaust in parallel through a bypass channel coupled to upstream of the first turbine, to only the first channel of the second turbine; and
during a third mode, directing exhaust through the bypass channel to both the first channel and a second channel of the second turbine.

18. The method of claim 17 further comprising during a fourth mode, directing exhaust through only the bypass channel to both the first and second channels of the second turbine and not through the first turbine.

19. The method of claim 18 wherein during the first mode no exhaust flows through the bypass channel and the second channel of the second turbine, and wherein during the second mode exhaust flows through the bypass channel but no exhaust flows through the second channel of the second turbine, and wherein during the third and fourth modes exhaust flows through the bypass channel to both the first and second channels of the second turbine, wherein the first turbine has only a single channel, wherein the first, second, third, and fourth modes are carried out mutually exclusively and operation transitions between the modes by adjusting a valve upstream of the second turbine in a passage in parallel with the first turbine.

* * * * *